(12) United States Patent
Bourgeois

(10) Patent No.: US 7,358,005 B2
(45) Date of Patent: Apr. 15, 2008

(54) METHODS AND APPARATUS FOR ISOLATING SOLID OXIDE FUEL CELLS

(75) Inventor: Richard Scott Bourgeois, Albany, NY (US)

(73) Assignee: General Electric Company, Niskayuna, NY (US)

( * ) Notice: Subject to any disclaimer, the term of this patent is extended or adjusted under 35 U.S.C. 154(b) by 616 days.

(21) Appl. No.: 10/665,942

(22) Filed: Sep. 18, 2003

(65) Prior Publication Data

US 2005/0064254 A1 Mar. 24, 2005

(51) Int. Cl.
*H01M 2/00* (2006.01)
*H01M 8/00* (2006.01)

(52) U.S. Cl. .......................... 429/34; 429/12
(58) Field of Classification Search ................ 429/34, 429/12
See application file for complete search history.

(56) References Cited

U.S. PATENT DOCUMENTS

| | | | |
|---|---|---|---|
| 3,808,534 A | 4/1974 | Summers et al. | |
| 4,397,918 A | 8/1983 | Chi | |
| 5,462,815 A | 10/1995 | Horiuchi | |
| 5,549,983 A | 8/1996 | Yamanis | |
| 5,688,610 A | 11/1997 | Spaeh et al. | |
| 5,770,327 A | 6/1998 | Barnett et al. | |
| 5,786,105 A | 7/1998 | Matsushima et al. | |
| 5,833,822 A * | 11/1998 | Hsu | 204/270 |
| 6,096,449 A | 8/2000 | Fuglevand et al. | |
| 6,110,612 A | 8/2000 | Walsh | |
| 6,218,035 B1 | 4/2001 | Fuglevand et al. | |
| 6,218,038 B1 * | 4/2001 | Oko et al. | 429/34 |
| 6,296,962 B1 | 10/2001 | Minh | |
| 6,322,919 B1 | 11/2001 | Yang et al. | |
| 6,344,290 B1 * | 2/2002 | Bossel | 429/38 |
| 6,387,556 B1 | 5/2002 | Fuglevand et al. | |
| 6,468,682 B1 | 10/2002 | Fuglevand et al. | |
| 6,488,739 B1 | 12/2002 | Mazanec et al. | |
| 6,489,050 B1 | 12/2002 | Ruhl et al. | |
| 6,492,053 B1 | 12/2002 | Donelson et al. | |
| 7,021,603 B2 * | 4/2006 | Wygnaski | 251/129.15 |
| 2002/0024185 A1 | 2/2002 | Ghosh et al. | |

OTHER PUBLICATIONS

"Design and Materials for Metallic Housing in the SOFC Spray Concept at DLR," Patric Szabo, et al., Institut fur technische Thermodynamik, Stuttgart, Germany, pp. 806-807.

* cited by examiner

*Primary Examiner*—Tracy Dove
*Assistant Examiner*—Helen O. K. Chu
(74) *Attorney, Agent, or Firm*—Fletcher Yoder

(57) ABSTRACT

A fuel cell stack assembly includes at least a first fuel cell and a second fuel cell electrically coupled together such that at least one sealed passage extends between the first and second fuel cells. Each of the fuel cells includes at least one hollow manifold that includes a wall extending between a first end and a second end. Each wall defines a chamber therein, and includes at least one opening extending therethrough in flow communication with the chamber. The fuel cell stack assembly also includes at least one fuel cell isolation device coupled in flow communication with each fuel cell hollow manifold. The at least one fuel cell isolation device is variably positionable during fuel cell stack assembly operation for selectively stopping fluid flow through at least one of the fuel cells.

24 Claims, 7 Drawing Sheets

METHODS AND APPARATUS FOR ISOLATING SOLID OXIDE FUEL CELLS

BACKGROUND OF THE INVENTION

This invention relates generally to power generation, and more specifically, to methods and apparatus for assembling solid oxide fuel cells.

At least some known power generation systems use fuel cells to produce power. A fuel cell is an electrochemical device that converts chemical energy produced by a reaction directly into electrical energy. Known fuel cells typically include an anode, also known as a fuel electrode, a cathode, also known as an oxidant electrode, and an electrolyte. Such fuel cells are electrochemical devices, similar to batteries, which react fuel and oxidant to produce electricity. However, unlike batteries, fuel such as hydrogen and oxidant such as air are supplied continuously to the fuel cell such that it continues to produce power so long as such reactants are provided.

A fuel cell produces electricity by catalyzing fuel and oxidant into ionized atomic hydrogen and oxygen at, respectively, the anode and cathode. The electrons removed from hydrogen in the ionization process at the anode are conducted to the cathode where they ionize the oxygen. In the case of a solid oxide fuel cell, the oxygen ions are conducted through the electrolyte where they combine with ionized hydrogen to form water as a waste product and complete the process. The electrolyte is otherwise impermeable to both fuel and oxidant and merely conducts oxygen ions. This series of electrochemical reactions is the sole means of generating electric power within the fuel cell. It is therefore desirable to reduce or eliminate any mixing of the reactants, as such mixing would result in a different combination such as combustion which produces no electric power and therefore reduces the efficiency of the fuel cell.

Individual fuel cells produce power at low voltage, typically less than about 1 Volt per cell. The cells are therefore typically assembled in electrical series in a fuel cell stack to produce power at useful voltages. To create a fuel stack, an interconnecting member is used to connect the adjacent fuel cells together in electrical series. In such an arrangement, fuel flows at a substantially equal flow rate to each of the fuel cells. As a result, the failure of a single fuel cell may cause the failure of the entire fuel stack.

To enable fuel stacks to continue to operate after a fuel cell fails, at least some known fuel stacks include a plurality of valves which are magnetically actuated from external to the cell to restrict fuel flow to the failed cell. However, actuating such valves will limit fuel flow to affected cells without isolating them electrically from the other cells, and as such, may severely limit the continued operation of the fuel cell stack. In at least some other known fuel cell stacks, a conductor is inserted within the failed fuel cell to short-circuit the cell such that the fuel cell stack may be operable with the remaining fuel cells. However, because at least a portion of the stack must be disassembled to insert the conductor, the fuel cell stack can not be operated during the insertion of the conductor. Furthermore, returning the stack to a safe working and operating temperature may shorten the useful life of the stack due to thermal cycling damage.

BRIEF DESCRIPTION OF THE INVENTION

In one aspect, a fuel cell stack assembly is provided. The fuel cell stack assembly includes at least a first fuel cell and a second fuel cell electrically coupled together such that at least one sealed passage extends between the first and second fuel cells. Each of the fuel cells includes at least one hollow manifold that includes a wall extending between a first end and a second end. Each wall defines a chamber therein, and includes at least one opening extending therethrough in flow communication with the chamber. The fuel cell stack assembly also includes at least one fuel cell isolation device coupled in flow communication with each fuel cell hollow manifold. The at least one fuel cell isolation device is variably positionable during fuel cell stack assembly operation for selectively stopping fluid flow through at least one of the fuel cells.

In another aspect, a fuel cell stack coupled in flow communication to an air source and a fuel source is provided. The fuel cell stack includes at least three fuel cells coupled together in flow communication such that at least one sealed passage extends between the at least three fuel cells, and a plurality of interconnects that electrically couple the at least three fuel cells together such that at least one interconnect extends between each adjacent pair of fuel cells. The fuel cell stack also includes at least one fuel cell isolation device coupled in flow communication with each of the at least three fuel cells. The at least one fuel cell isolation device is selectively positionable during fuel cell stack operation to electrically isolate at least one of the fuel cells from the remaining fuel cells.

In yet another aspect, a method for assembling a fuel cell stack is provided. The method includes electrically coupling a first fuel cell to a second fuel cell such that at least one seal passage extends between the first and second fuel cells, and coupling at least one fuel cell isolation device within the at least one seal passage such that the at least one fuel cell isolation device is variably positionable to electrically isolate at least one of the first and second fuel cells during operation of the fuel cell stack.

In a further aspect, a method for operating a fuel cell stack assembly including at least two fuel cells that are electrically coupled in series together is provided. The method includes determining a fault exists within an operating fuel cell stack assembly, electrically isolating and stopping reactant flow to at least one of the fuel cells during operation of the fuel cell stack assembly, and continuing operation of the fuel cell stack assembly with at least one fuel cell electrically isolated from the remaining fuel cells within the fuel cell stack assembly.

DETAILED DESCRIPTION OF THE INVENTION

Figure 1:
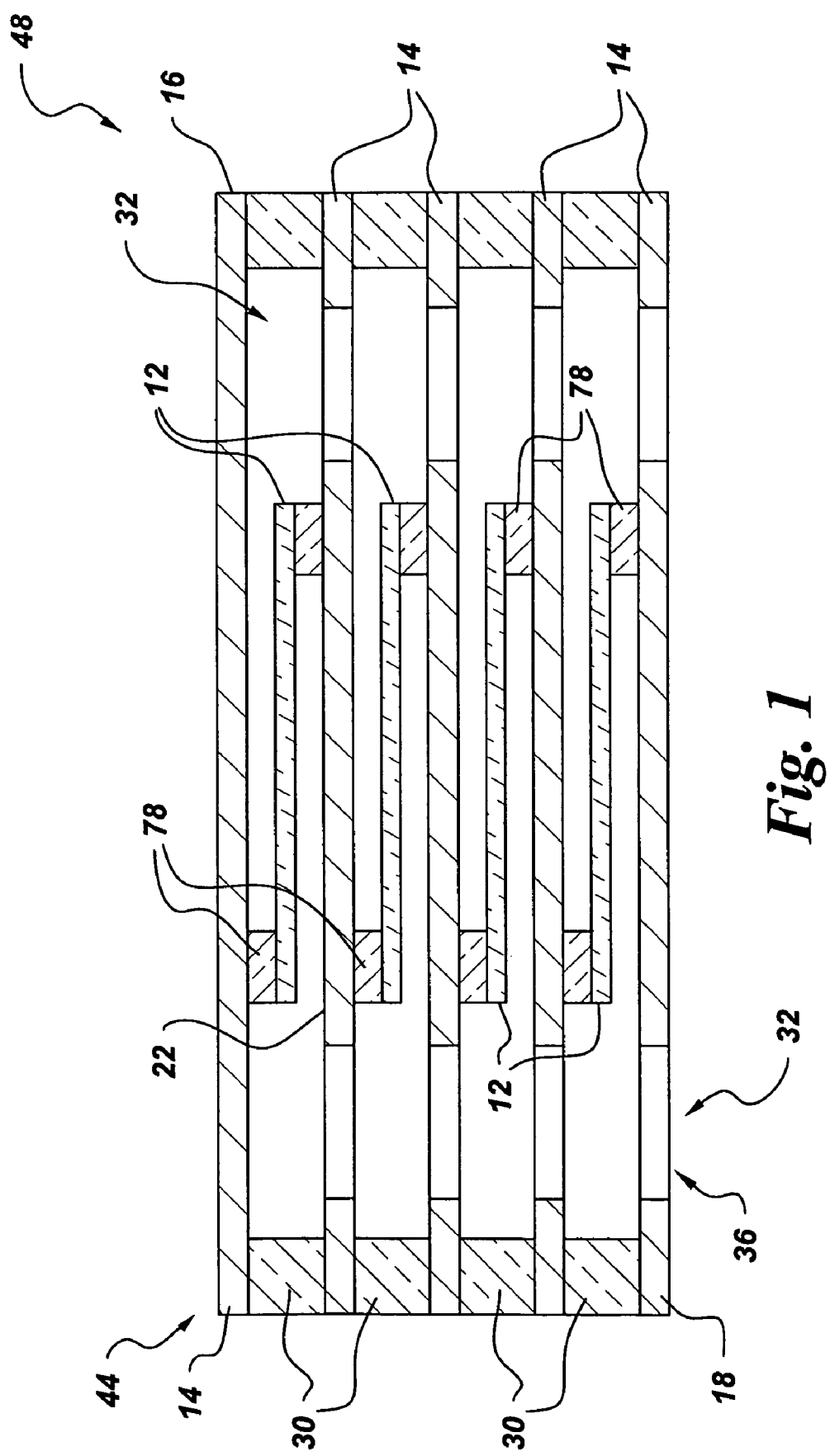
FIG. 1 is a cross-sectional view of an exemplary fuel cell stack.
Figure 2:
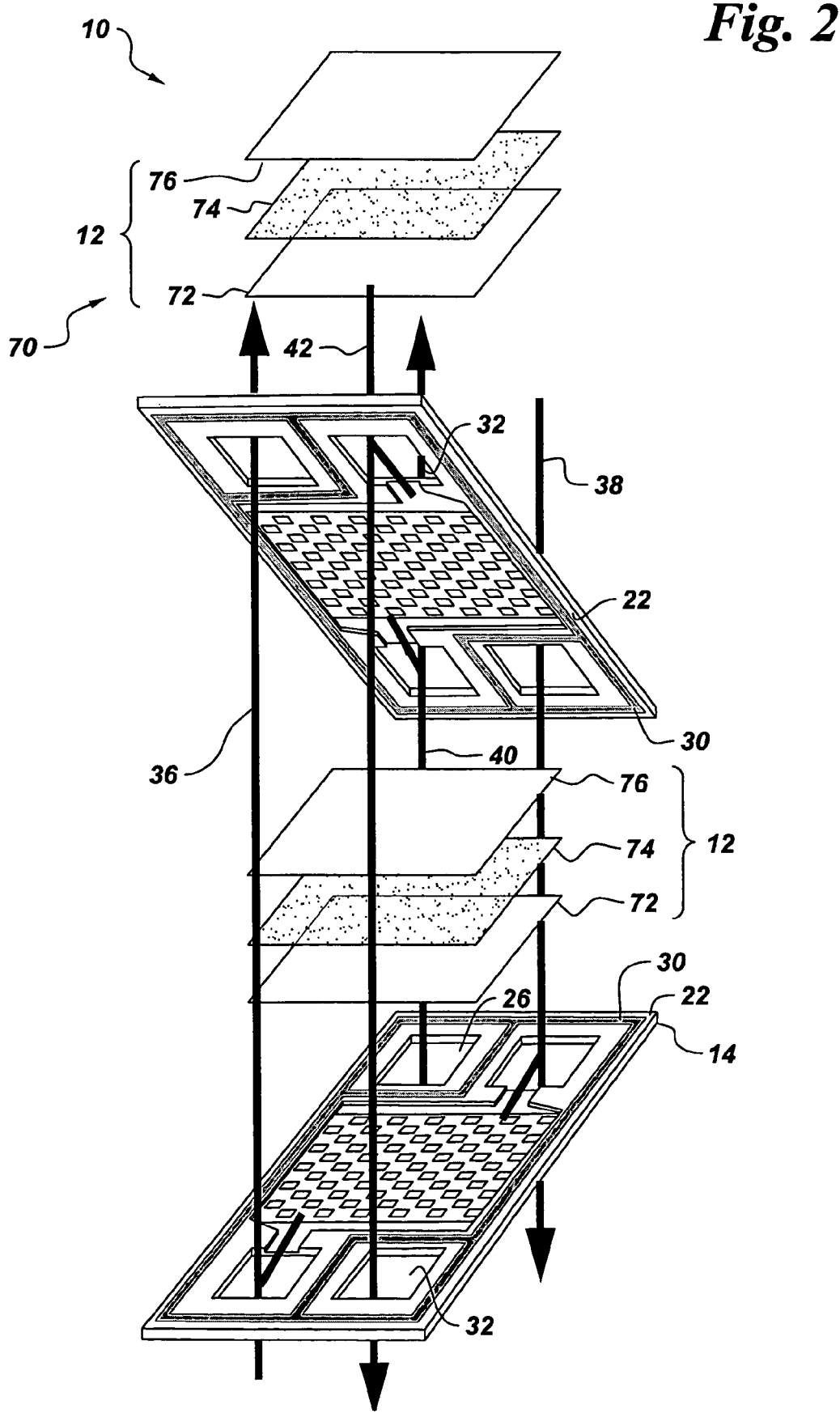
FIG. 2 is an exploded view of a portion of the fuel cell stack shown in FIG. 1.
Figure 3:
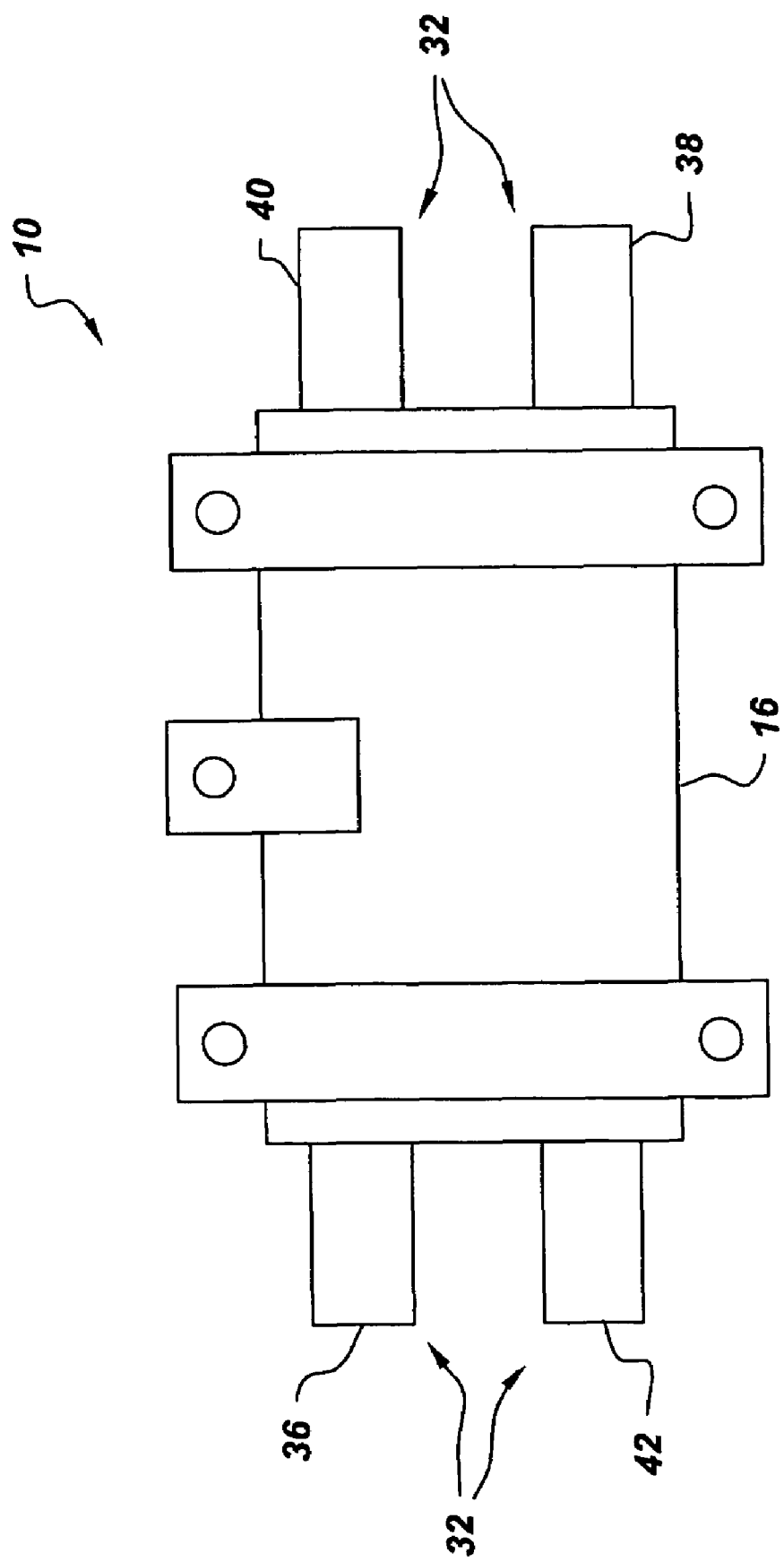
FIG. 3 is a schematic top plan view of the fuel cell stack shown in FIG. 1.

FIG. 1 is a cross-sectional view of an exemplary fuel cell stack 10 that includes a plurality of fuel cells 12. FIG. 2 is an exploded view of a portion of fuel cell stack 10. FIG. 3 is a schematic top plan view of fuel cell stack 10. Fuel cell stack 10 is known as a planar, interconnect-supported fuel cell stack, in which adjacent fuel cells 12 are separated by a plurality of interconnects 14, such that at least one interconnect 14 extends between each pair of adjacent fuel cells 12. More specifically, fuel cells 12 are coupled together in series such that fuel cell stack 10 includes a top stack plate 16, a bottom stack plate 18, and a plurality of interconnects 14 that are positioned between top stack plate 16 and bottom stack plate 18. In the exemplary embodiment, each interconnect 14 is hollow and includes outer surface 22 and an internal chamber 24 therein.

In the exemplary embodiment, top stack plate 16, bottom stack plate 18, and interconnects 14, are each sized identically. In an alternative embodiment, at least one of top stack plate 16, bottom stack plate 18, and/or interconnect 14 is sized differently than the remaining fuel cell stack components. Stack plates 16 and 18 are fabricated from an electrically-conductive material. For example, stack plates 16 and 18 may be fabricated from conductive materials capable of operating at higher temperatures as described herein, such as, any material that is electrically conductive, or any material that if subject to oxidation, its oxide is conductive. Each interconnect 14 is also fabricated from an electrically conductive material, such as, but not limited to, conductive materials capable of operating at higher temperatures as described herein, such as, but not limited to, a stainless steel.

A plurality of seal members 30 extend between adjacent interconnects 14. More specifically, adjacent fuel cells 12 are separated by a plurality of seal members 30, respectively, such that fuel cells 12 form a planar arrangement of solid oxide fuel cells. Seals 30 facilitate electrically isolating adjacent fuel cells 12 to prevent short-circuiting between cells 12. Each seal members 30 typically comprises a hollow electrical insulator (not shown) that may be fabricated from, but is not limited to, a ceramic material. In one embodiment, seal members 30 are fabricated from, but are not limited to being fabricated from, mica or a glass-mica composite material.

When seal members 30 are coupled between adjacent interconnects 14, a plurality of sealed passages 32 are defined. More specifically, in the exemplary embodiment, fuel cell reactants are supplied to, and channeled from, fuel cell stack 10 through sealed passages 32. More specifically, in the exemplary embodiment, fuel and air are both internally manifolded, and as such, passages 32 include a fuel inlet manifold 36, a fuel outlet manifold 38, an oxidant or air inlet manifold 40, and an oxidant or air outlet manifold 42. In an alternative embodiment, the oxidant or air is externally manifolded through fuel cell stack 10.

Each interconnect chamber 24 extends from a first side 44 of interconnect 14 to a second side 48 of stack 10. More specifically, in the exemplary embodiment, chamber 24 has a substantially rectangular cross-sectional profile. In another embodiment, chamber 24 has a non-rectangular cross-sectional profile. In another embodiment, chamber 24 includes flow guides, baffles, and/or channeling features to facilitate distributing fuel and oxidant within interconnect 14.

A plurality of openings 60 extend at least partially through interconnect 14 and are in flow communication with interconnect chamber 24. In the exemplary embodiment, openings 60 are arranged in a substantially colinear configuration, i.e., openings 60 are arranged in a linear sequence within a plurality of rows.

In the exemplary embodiment, each fuel cell 12 is formed from a plurality layers 70. More specifically, in the exemplary embodiment, fuel cell 12 includes an anode layer 72, an electrolyte layer 74, and a cathode layer 76 coupled together such that electrolyte layer 74 is sandwiched between layers 72 and 76, and such that a seal member 78 extends between each fuel cell 12 and each adjacent interconnect 14. Fuel cells 12 are coupled within fuel cell stack 10 to enable electricity to be conducted from one fuel cell anode layer 72 to a cathode layer 76 of an adjacent cell 12. In one embodiment, electrolyte layer 74 is fabricated from a material such as, but is not limited to, yttrium-stabilized zirconia (YSZ), and cathode layer 76 ma include, but is not limited to, lanthanum strontium manganate (LSM).

Adjacent interconnects 14 are coupled together such that an oxidant flow area 80 is defined therebetween. Each oxidant flow area 80 is coupled in flow communication to air inlet manifold 40 and air outlet manifold 42.

During operation, a fuel, such as, but not limited to, a preformed fuel, and/or a hydrocarbon which is reformed within fuel cell stack 10, is supplied to fuel cell stack 10 through fuel inlet manifold 36. After entering inlet manifold 36, fuel is routed through each interconnect chamber 24. Fuel flows over and reacts with each anode layer 72 prior to being discharged from fuel stack 10 through fuel outlet 38. Fuel and oxidant react in each fuel cell 12, which are connected in series within stack 10, to build voltage to useful levels. More specifically, the fuel reacts electrochemically with oxygen, supplied to stack 10 through air inlet manifold 40, to generate direct current (DC) electricity with water as the main product. In the exemplary embodiment, stack 10 is arranged such that the fuel cell reactants flow through stack 10 in opposite directions. In another embodiment, stack 10 is arranged such that the flow directions of the reactants flow through stack 10 are substantially parallel and in the same flow direction. Current is generated as the fuel and oxidant react, and a voltage potential is generated across stack 10.

Figure 4:
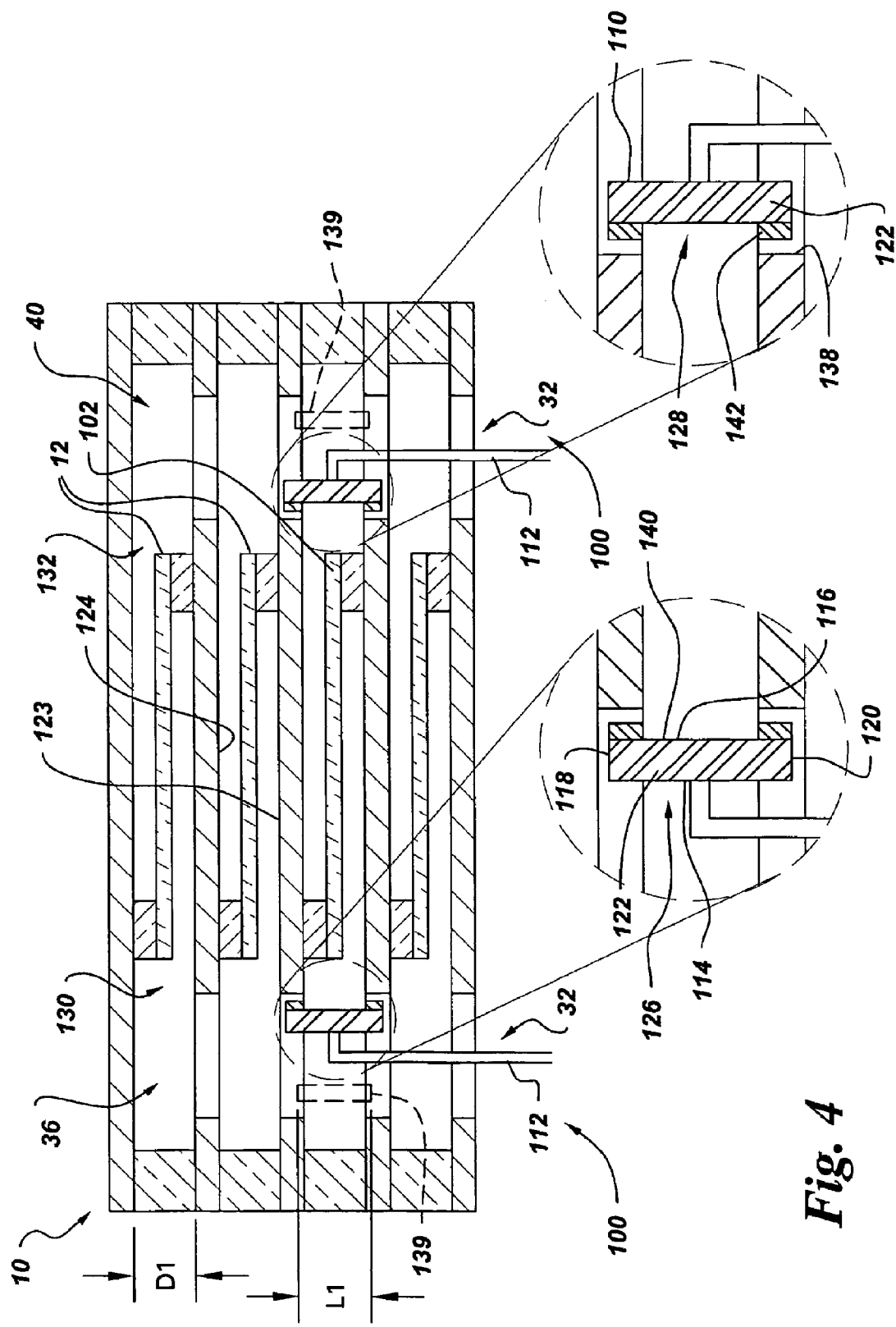
FIG. 4 is a cross-sectional view of a fuel cell isolation assembly that may be used with the fuel cell stack shown in FIG. 1.

FIG. 4 is a side view of fuel cell isolation assembly 100 that may be used with fuel cell stack 10. In the exemplary embodiment, at least one fuel cell 102 has been determined, as described in more detail below, to have failed or have been damaged to a degree that may adversely affect stack performance. During stack operation, fuel cell isolation assembly 100, as described in more detail below, facilitates isolating the damaged fuel cell 102 from the remaining fuel cells 12 without ceasing operation of stack 10.

Each fuel cell isolation assembly 100 includes a jumper 110 and an actuator 112 that is coupled to jumper 110 for controlling movement of jumper 110. Jumper 110 is fabricated from an electrically-conductive material and includes a radially outer surface 114 and an opposite radially inner surface 116 that extend longitudinally between an upper sidewall 118 and a lower sidewall 120. Jumper 110 is arcuately-shaped and extends arcuately between a first endwall (not shown) and a second endwall 122. In the exemplary embodiment, each jumper 110 is substantially semicircular.

Each jumper 110 has a length $L_1$ that is longer than a distance $D_1$ measured between adjacent interconnects 14. More specifically, distance $D_1$ is measured between an upper surface 123 of a first interconnect 14, and a lower surface 124 of an adjacent second interconnect 14. As described in more detail below, jumper length $L_1$ enables each jumper 110 to electrically connect a pair of adjacent interconnects 14 together.

In the exemplary embodiment, a pair of jumpers 126 and 128 are coupled across respective opposite ends 130 and 132 of a pair of interconnects 14. More specifically, in the exemplary embodiment, jumper 126 is positioned within fuel inlet manifold 36 and jumper 128 is positioned within fuel exit manifold 40 to isolate fuel cell 102. In an alternative embodiment, only jumper 110 is used to isolate fuel cell 102. In another alternative embodiment, jumpers 110 are positioned within fuel inlet manifold 36, fuel outlet manifold 38 (shown in FIG. 3), air inlet manifold 40, and air outlet manifold 42 (shown in FIG. 3). Accordingly, each jumper 110 is contoured to substantially match the curved contour defined by an inner surface 138 of each respective sealed passage 32. The curved contour of each jumper 110 facilitates reducing the cross-sectional area of each jumper 110 within each passage 32 such that flow through passage 32 remains substantially unobstructed until each jumper 110 is positioned to isolate a failed fuel cell 102. Moreover, the curved contour, and the semi-circular shape of each jumper 110 enables a jumper 110 being positioned to isolate a newly-detected failed fuel cell 102 to be moved by actuator 112 through a respective passage 32 and past a jumper 110 already coupled to electrically isolate a failed fuel cell 110. In one embodiment, actuator 112 is actuated by at least one of, but not limited to, a linear motor, a screw gear, or any other mechanical means suitable for selectively positioning jumper 110 as described herein. In another embodiment, actuator 112 is actuated by at least one of, but not limited to, pneumatic pressure, hydraulic pressure, electromagnetic force, and electric power.

In the exemplary embodiment, each jumper 110 is rotatably coupled to an actuator 112 such that longitudinal movement, and rotational movement, of each jumper 110 with respect to fuel cell stack 10 is controlled by actuator 112. Accordingly, each jumper 110 is variably positionable within each respective sealed passage 32 such that any fuel cell 12 may be selectively isolated as described herein. More specifically, during normal operation of fuel cell stack 10, each jumper 110 remains coupled within a respective sealed passage 32 in a ready position 139, wherein jumpers 110 are not electrically coupled to any interconnects. Ready position 139 enables jumpers 110 to remain coupled within sealed passage 32 such that fluid flow through each respective sealed passage 32 into cells 12 remains substantially unobstructed until jumpers 110 are positioned to isolate a failed cell 102. In an alternative embodiment, fuel cell stack 10 includes a plurality of jumpers 110 that are not movable longitudinally through sealed passages 32, but rather jumpers 110 are integral to each cell 12 and are only moveable between ready position 139 and against interconnects 14, as described herein. In such an embodiment, either jumpers 110 and/or interconnects 14 incorporate conducting and non-conducting surfaces such that jumpers 110 only short-circuit cells 12 when rotated from ready position 139 to isolate the failed cell 102.

When coupled in position, jumpers 110 electrically connect a pair of adjacent interconnects 14 together such that the pair of interconnects are "short-circuited." More specifically, each jumper 110 is positioned such that an outer surface 140 of jumper 110 is electrically coupled to each interconnect 14 that is adjacent the damaged fuel cell 102. Each jumper outer surface 140 includes features 142 that facilitates establishing an electrical connection between each jumper 110 and each interconnect. In addition, the combination of the contour of each jumper 110 and jumper external surface features 142 facilitates sealing contact between each jumper 110 and each interconnect 14. For example, in one embodiment, at least one of a wire mesh, a brush, and/or a metallic seal extends outwardly from jumper outer surface 140 to facilitate electrical contact and sealing between each jumper 110 and each respective interconnect 14.

During fuel cell stack operation, when a damaged or failed fuel cell 102 is detected, as described in more detail below, a jumper 110 is positioned to isolate cell 102 from the remaining fuel cells 12 such that fuel cell stack operation may continue without interruption. More specifically, after cell 102 is detected, in the exemplary embodiment, jumper 110 is moved longitudinally into ready position 139 through the use of actuator 112. Jumper 110 is then rotated such that jumper outer surface is electrically coupled between a pair of adjacent interconnects 14, and more specifically, such that fuel cell 102 is electrically isolated from the remaining fuel cells 12. Moreover, when jumper 110 has electrically isolated fuel cell 102, the combination of the jumper contour and jumper external surface 140 facilitates sealing between jumper 110 and the pair of interconnects 14 to substantially prevent fuel flow and/or fuel and air flow (depending on which sealed passage jumper 110 is coupled with respect to stack 10) to fuel cell 102.

Accordingly, because cell 102 is electrically isolated, and because fuel flow and/or fuel and air flow to cell 102 is substantially prevented, fuel cell stack 10 may continue operation. Moreover, if multiple cells 102 have failed, additional jumpers 110 may be installed within the same fuel cell stack passage 32, as described herein.

In the exemplary embodiment, the performance of each individual cell is continuously monitored, and upon detection of a failed cell, a jumper is positioned to isolate that particular cell. In an alternative embodiment, the voltage and performance of individual cells are not monitored, but rather the overall performance of the fuel cell stack is monitored and held determinative of a failed fuel cell. More specifically, when the performance of the stack is reduced, the reduced performance is indicative of a failed fuel cell. After detecting a reduction in stack performance, a jumper is moved through the fuel inlet manifold and is coupled against each fuel cell while continuously monitoring the output performance of the fuel cell stack. When the performance monitoring indicates that the cell stack performance has increased, the jumper is then locked in position within the fuel inlet manifold. If additional jumpers are available within other manifolds, then those jumpers are also placed in position relative to the detected failed fuel cell.

In another embodiment, the fuel cell stack is coupled to a processor and a controller which enables the performance of the stack to be continuously monitored such that upon detection of a failed cell, a jumper is automatically positioned and coupled to the stack to effectively isolate the failed cell.

Figure 5:
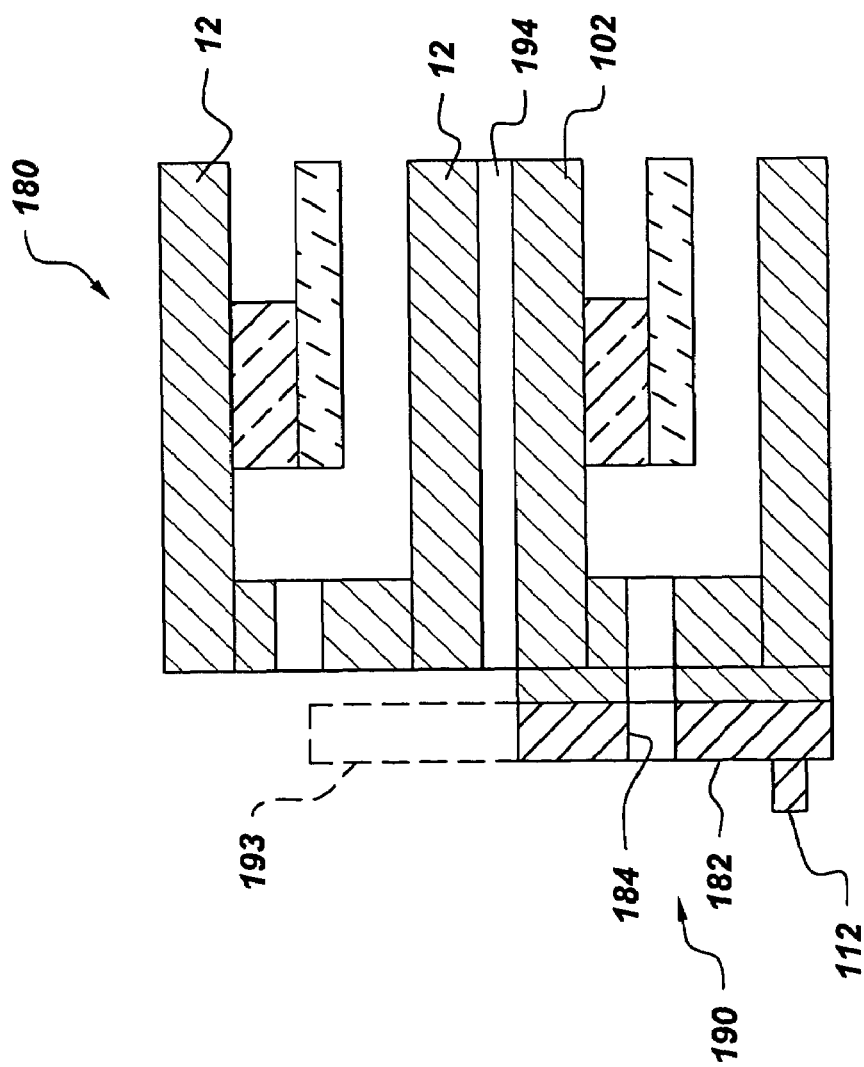
FIG. 5 is an enlarged partial cross-sectional view of an alternative embodiment of a fuel cell isolation assembly that may be used with the fuel cell stack shown in FIG. 1.

FIG. 5 is an enlarged schematic view of an alternative embodiment of fuel cell isolation assembly 180 that may be used with fuel cell stack 10. Fuel cell isolation assembly 180 is substantially similar to fuel cell isolation assembly 100 (shown in FIG. 4) and components in fuel cell isolation assembly 180 that are identical to components of fuel cell isolation assembly 100 are identified in FIG. 5 using the same reference numerals used in FIG. 4. Accordingly, fuel cell isolation assembly 180 includes a jumper 182 that is controlled by actuator 112. Each jumper 182 includes a flow passageway 184 extending therethrough that in the exemplary embodiment, enables fuel flow to be supplied to each respective fuel cell 12. More specifically, fuel cell stack 10 includes a plurality of jumpers 182 that are each slidably coupled to a respective fuel cell 12 to selectively isolate that particular fuel cell 12 as described herein. More specifically, during normal operation of fuel cell stack 10, each jumper 182 remains coupled within a respective sealed passage 32 in a ready position 190, wherein jumper passageway 184 is positioned to enable fuel flow to fuel cell 12, and such that fluid flow through each respective sealed passage 32 into every other cell 12 remains substantially unobstructed.

When a failed fuel cell 102 requires isolation, jumper 182 is transitioned from ready position 190 into an isolation position 193 wherein that particular fuel cell 12 is isolated from the remaining fuel cells 12. More specifically, when transitioned into isolation position 193, passageway 184 is positioned against an insulating layer 194 extending between adjacent fuel cells 12 such that fuel flow to the failed cell 102 is prevented.

Figure 6:
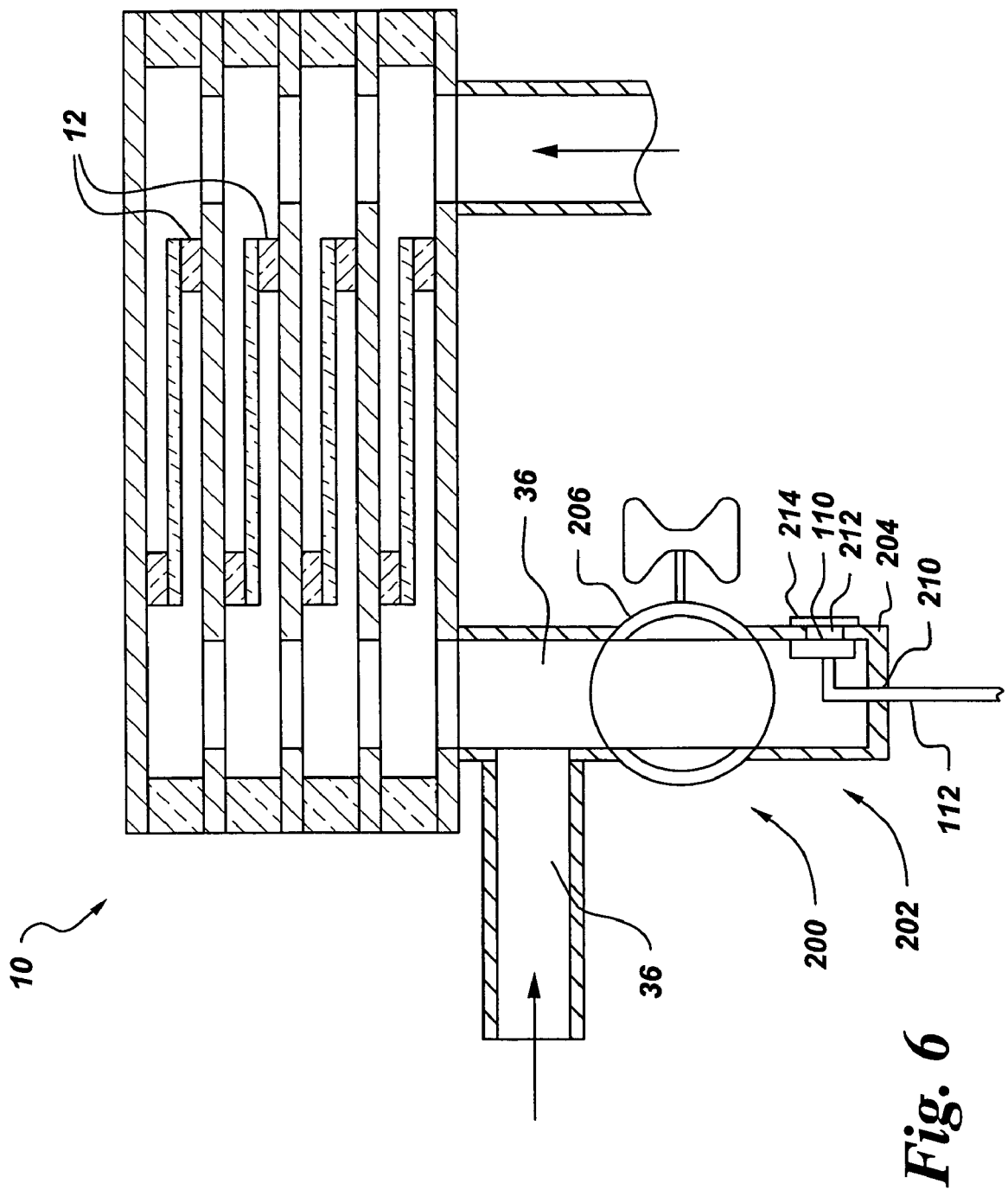
FIG. 6 is an enlarged schematic view of a further alternative embodiment of a fuel cell isolation assembly that may be used with the fuel cell stack shown in FIG. 1.

FIG. 6 is an enlarged schematic view of an alternative embodiment of fuel cell isolation assembly 200 that may be used with fuel cell stack 10. Fuel cell isolation assembly 200 is substantially similar to fuel cell isolation assembly 100 (shown in FIG. 4) and components in fuel cell isolation assembly 200 that are identical to components of fuel cell isolation assembly 100 are identified in FIG. 6 using the same reference numerals used in FIG. 4. Accordingly, fuel cell isolation assembly 200 includes jumper 110 and actuator 112. Fuel cell assembly 200 also includes a jumper reloader system 202 that enables, as described in more detail below, additional jumpers 110 to be inserted within fuel cell stack 10 during operation of fuel cell stack 10.

Jumper reloader system 202 includes an insertion housing 204 that is coupled in flow communication to fuel inlet manifold 36. In alternative embodiments, additional jumper reloader systems are coupled to other sealed passages 32. More specifically, a valve 206, such as a globe valve, is coupled between fuel inlet manifold 36 and Insertion housing 204 to selectively control flow communication between manifold 36 and insertion housing 204. When valve 206 is in a closed position, insertion housing 204 is substantially isolated from fuel inlet manifold 36. When valve 206 is rotated to an open position, fuel inlet manifold 36 and insertion housing 204 are coupled in flow communication, such that a jumper 110 may be inserted through valve 206 and into position, as described above in more detail, relative to a failed fuel cell 102 (shown in FIG. 4.

Housing 204 includes an actuator opening 210 and an access opening 212. Actuator opening 210 enables actuator 112 to be coupled to jumper 110 through housing 204 for controlling positioning of jumper 110. Access opening 212 is sized to receive jumpers 110 therethrough and includes a variably positioned door 214. When closed, door 214 substantially seals opening 210. When opened, door 214 enables additional jumpers 100 to be coupled to actuator 112 while fuel cell stack 10 remains in operation.

During fuel cell stack operation, when a damaged or failed fuel cell 102 is detected, valve 206 is rotated to an open position, and a jumper 110 is positioned to isolate cell 102 from the remaining fuel cells 12, as described in more detail above. When an additional fuel cell 12 is determined to have failed, jumper reloader system 202 enables additional jumpers 110 to be installed while fuel cell stack 10 remains in operation.

More specifically, when an additional jumper is to be installed, initially valve 206 is rotated closed to effectively isolate housing 204 from fuel inlet manifold 36. An additional jumper 110 is then coupled to actuator 112 through access door 214, and door 214 is then rotated closed to effectively seal access opening 212. Valve 206 is then opened and the additional jumper 110 is then moved into position relative to fuel cell stack 10. The curved contour, and the semi-circular shape of each jumper 110 enables the additional jumper 110 to be moved through manifold 36 and past a jumper 110 already coupled in position relative to fuel cell stack 10, while fuel cell stack 10 remains in operation.

Figure 7:
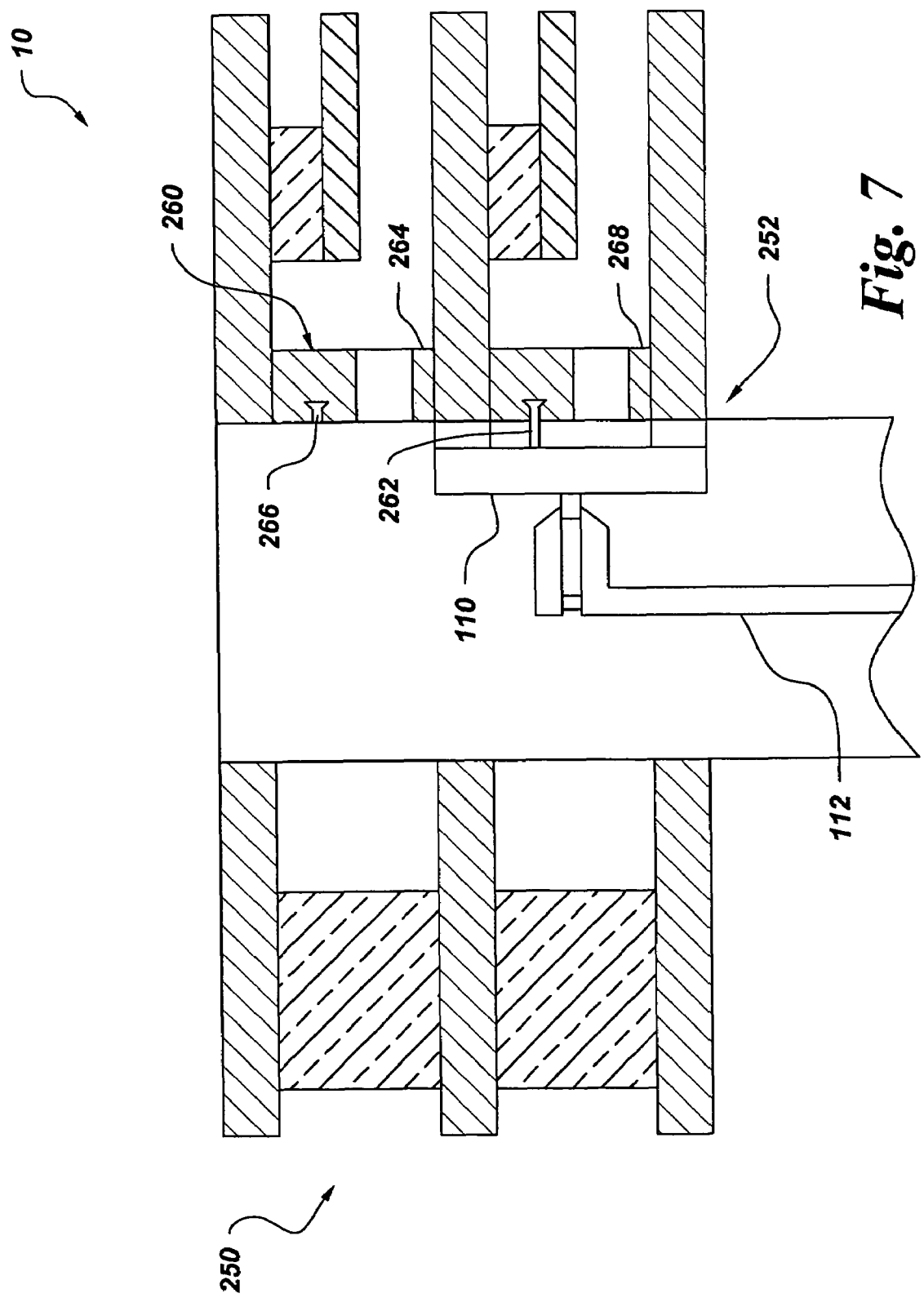
FIG. 7 is a cross-sectional view of another alternative embodiment of a fuel cell isolation device that may be used with the fuel cell stack shown in FIG. 1.

FIG. 7 is a side view of another alternative embodiment of a fuel cell isolation device 250 that may be used with fuel cell stack 10. Fuel cell isolation assembly 250 is substantially similar to fuel cell isolation assembly 100 (shown in FIG. 4) and fuel cell isolation assembly 200 (shown in FIG. 6), and components in fuel cell isolation assembly 250 that are identical to components of fuel cell isolation assemblies 100 and/or 250 are identified in FIG. 7 using the same reference numerals used in FIGS. 4 and 6. Accordingly, fuel cell isolation assembly 250 includes jumper 110 and actuator 112. Fuel cell assembly 250 also includes a jumper positioning system 252 that facilitates, as described in more detail below, positioning each jumper 110 in position relative to each fuel cell 12 coupled within stack 10.

Jumper positioning system 252 includes a plurality of keyway assemblies 260 and at least one key 262. Specifically, each keyway assembly 260 includes a support wall 264 that extends between adjacent interconnects 14 adjacent interconnect first end 44. In an alternative embodiment, keyway assemblies 260 are included in other sealed passages 32. Each support wall 264 includes a keyway 266 and a flow access opening 268 that, in the exemplary embodiment, enables fuel to flow from inlet manifold 36 between adjacent interconnects 14 and towards each fuel cell 12, as described in more detail above. Keyway 266 is defined within each support wall 264 and is sized to receive key 262 therein. In the exemplary embodiment, keyway 266 is substantially dovetail-shaped. In alternative embodiments, keyway 266 is non-dovetailed shaped.

Each key 266 extends radially outward from jumper outer surface 140 and is sized to be received within keyway 266 when jumper 110 is rotated into position relative to a failed fuel cell 102. Accordingly, when jumper 110 is rotated into position, and key 266 is received within keyway 266, jumper 110 is positioned relative to fuel cell 102 such that adjacent interconnects 14 are electrically coupled together as described in more detail above.

The above-described fuel cell isolation assemblies enable a failed fuel cell to be electrically isolated without interrupting operation of the fuel cell stack. The isolation assemblies each include a jumper coupled to an actuator that controls movement of the isolation assemblies. The jumper is fabricated from an electrically conductive material and is sized to extend between adjacent interconnects such that the jumper may electrically connects a pair of adjacent interconnects. Accordingly, as a result, failed fuel cells may be isolated from the remaining fuel cells while the fuel cell stack remains operational and in a cost-effective and reliable manner.

Exemplary embodiments of fuel cell stacks and fuel cell isolation assemblies are described above in detail. Neither the fuel cell stacks nor the fuel cell isolation assemblies are limited to the specific embodiments described herein, but rather, components of each stack or assembly may be utilized independently and separately from other components described herein. Each fuel cell stack component can also be used in combination with other fuel cell stack components. For example, in certain embodiments, the relative positions of the anode and the cathode within the stack may be exchanged, and similarly passages defined for fuel flow and oxidant may also be exchanged. Moreover, each fuel cell isolation assembly can also be used in combination with other fuel cell isolation assemblies and with other fuel cell stack components.

While the invention has been described in terms of various specific embodiments, those skilled in the art will recognize that the invention can be practiced with modification within the spirit and scope of the claims.

What is claimed is:

1. A fuel cell stack assembly comprising:
at least a first fuel cell and a second fuel cell electrically coupled together such that at least one sealed passage extends between said first and second fuel cells, each said fuel cell comprising at least one hollow manifold comprising a wall extending between a first end and a second end, each said wall defining a chamber therein, said wall comprising at least one opening extending therethrough in flow communication with said chamber; and
at least one fuel cell isolation device including a jumper, said fuel cell isolation device coupled in flow communication with each of said fuel cell hollow manifold, said at least one fuel cell isolation device being variably positionable during fuel cell stack assembly operation for selectively stopping fluid flow through at least one of said fuel cells and for positioning said jumper to short circuit said at least one fuel cell.

2. A fuel cell stack assembly in accordance with claim 1 further comprising a third fuel cell wherein a fuel inlet configured to channel fuel to said first, second, and third fuel cells, and a fuel outlet configured to channel fuel from said first, second, and third fuel cells, said at least one fuel cell isolation device positioned within at least one of said fuel inlet and said fuel outlet.

3. A fuel cell stack assembly in accordance with claim 1 wherein adjacent fuel cells are separated by a distance, said at least one fuel cell isolation device has a length that is longer than said fuel cell separation distance.

4. A fuel cell stack assembly in accordance with claim 1 wherein at least one interconnect extends between adjacent fuel cells, said at least one fuel cell isolation device is configured to electrically couple a pair of adjacent interconnects together.

5. A fuel cell stack assembly in accordance with claim 1 wherein said at least one fuel cell isolation device comprises an external surface having features selected from at least one of a wire mesh, a metallic seal, and a brush, said features extending outwardly from said external surface.

6. A fuel cell stack assembly in accordance with claim 1 wherein said at least one fuel cell isolation device is coupled to at least one actuator for controlling movement of said at least one fuel cell isolation device.

7. A fuel cell stack assembly in accordance with claim 1 wherein each said fuel cell further comprises at least one keyway positioned adjacent at least one of said manifold first end and said manifold second end, said keyway facilitates positioning said at least one fuel cell isolation device.

8. A fuel cell stack assembly in accordance with claim 1 wherein each said fuel cell further comprises at least one pre-positioned fuel cell isolation device that is movable by an actuator.

9. A fuel cell stack assembly in accordance with claim 1 further comprising a third fuel cell, said fuel cell stack assembly further compring a fuel inlet, a fuel outlet, and at least one valve, said fuel inlet for channeling fuel to said first, second, and third fuel cells, said fuel outlet for channeling fuel from said first, second, and third fuel cells, said valve for selectively controlling movement of said at least one fuel cell isolation device through at least one of said fuel inlet and said fuel outlet.

10. A fuel cell stack coupled in flow communication to an air source and a fuel source, said fuel cell stack comprising:
at least two fuel cells coupled together in flow communication such that at least one sealed passage extends between said at least two fuel cells;
a plurality of interconnects electrically coupling said at least two fuel cells together such that at least one interconnect extends between each adjacent pair of said at least two fuel cells; and
at least one fuel cell isolation device including a jumper, coupled in flow communication with each of said at least two fuel cells, said at least one fuel cell isolation device selectively positionable during operation of said fuel cell stack to position said jumper to short circuit said at least one fuel cell from said remaining at least two fuel cells.

11. A fuel cell stack in accordance with claim 10 wherein said at least one fuel cell isolation device is further selectively positionable to stop at least one of air flow and fuel flow to at least one fuel cell during fuel cell stack operation.

12. A fuel cell stack in accordance with claim 10 wherein said at least one fuel cell isolation device is selectively positionable in sealing contact against a portion of a pair of adjacent interconnects.

13. A fuel cell stack in accordance with claim 10 wherein said at least one fuel cell isolation device is selectively rotatable within said at least one hollow passage.

14. A fuel cell stack in accordance with claim 10 wherein said at least one sealed passage comprises at least one of a fuel inlet, a fuel outlet, an air inlet, and an air outlet, said at least one fuel cell isolation device is coupled within said at least one sealed passage.

15. A fuel cell stack in accordance with claim 10 wherein said at least one fuel cell isolation device comprises an external surface having features selected from at least one of a wire mesh, a metallic seal, and a brush coupled to said external surface for contacting at least one of said at least two fuel cells.

16. A fuel cell stack in accordance with claim 10 wherein each of said at least two fuel cells comprises at least one keyway defined therein, said keyway facilitates positioning said at least one fuel cell isolation device relative to said at least two fuel cells.

17. A fuel cell stack in accordance with claim 10 further comprising an actuator coupled to said at least one fuel cell isolation device, said actuator controls movement of said at least one fuel cell isolation device.

18. A fuel cell stack in accordance with claim 10 further comprising at least one valve for selectively controlling movement of said at least one fuel cell isolator device through said valve and into at least one sealed passage.

19. A fuel cell stack in accordance with claim 10 wherein said at least one fuel cell isolation device is formed integrally with at least one of said at least two fuel cells.

20. A fuel cell isolation assembly for use with a fuel cell stack including at least two fuel cells, said fuel cell isolation assembly comprising:

a fuel cell isolation device including a jumper, configured to be positioned within a sealed passage extending between the two fuel cells; and an actuator coupled to said fuel cell isolation device for controlling movement of said fuel cell isolation device such that said fuel cell isolation device is selectively positionable within the sealed passage during operation of the fuel cell stack to electrically isolate at least one of the fuel cells from the remaining fuel cells by short circuiting said at least one fuel cell via said jumper.

21. A fuel cell isolation assembly in accordance with claim 20 wherein adjacent fuel cells are separated within the stack by a distance, said fuel cell isolation device has a length that is longer than the distance defined between adjacent fuel cells.

22. A fuel cell isolation assembly in accordance with claim 20 wherein the adjacent fuel cells within the fuel stack are electrically coupled together such that at least one interconnect extends between the pair of fuel cells, said fuel cell isolation device is further configured to electrically couple a pair of adjacent interconnects together.

23. A fuel cell isolation assembly in accordance with claim 20 wherein said fuel cell isolation device comprises external surface having features selected from at least one of a wire mesh, a metallic seal, and a brush, said features extending outwardly from said external surface.

24. A fuel cell isolation assembly in accordance with claim 20 wherein said fuel cell isolation device comprises an external surface and a positioning projection extending outward from said external surface, said positioning position configured to facilitate positioning said fuel cell isolation device relative to the fuel stack.

* * * * *

UNITED STATES PATENT AND TRADEMARK OFFICE
CERTIFICATE OF CORRECTION

PATENT NO. : 7,358,005 B2 Page 1 of 1
APPLICATION NO. : 10/665942
DATED : April 15, 2008
INVENTOR(S) : Richard Scott Bourgeois It is certified that error appears in the above-identified patent and that said Letters Patent is hereby corrected as shown below:

On the Title Page, Item (54)

The title of the patent is incorrect. Please correct the title as follows:

--METHODS AND APPARATUS FOR ASSEMBLING SOLID OXIDE FUEL CELLS--.

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,358,005 B2  
APPLICATION NO. : 10/665942  
DATED : April 15, 2008  
INVENTOR(S) : Richard Scott Bourgeois Page 1 of 1

It is certified that error appears in the above-identified patent and that said Letters Patent is hereby corrected as shown below:

On the Title Page, Item (54) and Column 1, lines 1 and 2,

The title of the patent is incorrect. Please correct the title as follows:

--METHODS AND APPARATUS FOR ASSEMBLING SOLID OXIDE FUEL CELLS--.

This certificate supersedes the Certificate of Correction issued August 18, 2009.

Signed and Sealed this

Eighth Day of September, 2009

David J. Kappos  
*Director of the United States Patent and Trademark Office*